(12) United States Patent
Jo et al.

(10) Patent No.: US 11,795,344 B2
(45) Date of Patent: Oct. 24, 2023

(54) MULTILAYER MARKING FILM

(71) Applicant: LG Chem, Ltd., Seoul (KR)

(72) Inventors: Myung Hyun Jo, Daejeon (KR); Hye Jin Sim, Daejeon (KR); Jang Soon Kim, Daejeon (KR)

(73) Assignee: LG Chem, Ltd.

(*) Notice: Subject to any disclaimer, the term of this patent is extended or adjusted under 35 U.S.C. 154(b) by 141 days.

(21) Appl. No.: 16/493,552

(22) PCT Filed: Jun. 1, 2018

(86) PCT No.: PCT/KR2018/006289
§ 371 (c)(1),
(2) Date: Sep. 12, 2019

(87) PCT Pub. No.: WO2018/222002
PCT Pub. Date: Dec. 6, 2018

(65) Prior Publication Data
US 2020/0010722 A1 Jan. 9, 2020

(30) Foreign Application Priority Data
Jun. 1, 2017 (KR) .................. 10-2017-0068598

(51) Int. Cl.
*C09D 175/16* (2006.01)
*C09D 133/14* (2006.01)
(Continued)

(52) U.S. Cl.
CPC ......... *C09D 175/16* (2013.01); *C09D 133/14* (2013.01); *G09F 3/02* (2013.01);
(Continued)

(58) Field of Classification Search
CPC .......... B32B 3/30; B32B 27/08; B32B 27/20; B32B 27/40; B32B 2519/00;
(Continued)

(56) References Cited

U.S. PATENT DOCUMENTS 6,998,425 B2 * 2/2006 Chisholm ................ C09D 4/00
522/18
8,871,322 B2 * 10/2014 Groenewolt ............ C09D 4/06
428/64.7
(Continued)

FOREIGN PATENT DOCUMENTS

CN 102950850 A 3/2013
CN 103430345 A 12/2013
(Continued)

OTHER PUBLICATIONS

International Search Report for Application No. PCT/KR2018/006289, dated Sep. 10, 2018, pp. 1-2.
(Continued)

*Primary Examiner* — Maria V Ewald
*Assistant Examiner* — Daniel P Dillon
(74) *Attorney, Agent, or Firm* — Lerner David LLP (57) ABSTRACT

A multilayer marking film is disclosed herein. In some embodiments, a multilayer marking film includes, in sequential order, an adhesive layer, a colored base layer having a first color, and a colored coating layer having a second color, wherein information can be written by laser irradiation on the colored coating layer.

13 Claims, 3 Drawing Sheets

(51) Int. Cl.
*G09F 3/02* (2006.01)
*B32B 3/30* (2006.01)
*C08K 3/22* (2006.01)

(52) U.S. Cl.
CPC ............... *C08K 2003/2241* (2013.01); *G09F 2003/0208* (2013.01); *G09F 2003/0257* (2013.01)

(58) Field of Classification Search
CPC ............ C08F 222/1065; C08F 290/067; C08F 299/065; C08K 3/04; C08K 9/04; C08K 2003/2241; C08K 2201/011; C09D 133/14; C09D 151/08; C09D 175/16; G09F 3/02; G09F 2009/0208; G09F 2003/0255; G09F 2003/0257
See application file for complete search history.

(56) References Cited

U.S. PATENT DOCUMENTS

| | | | |
|---|---|---|---|
| 8,980,413 | B2 | 3/2015 | Kang et al. |
| 8,999,509 | B2* | 4/2015 | Port ................... C09D 133/08 528/65 |
| 2003/0031861 | A1 | 2/2003 | Reiter et al. |
| 2010/0069239 | A1 | 3/2010 | Asai et al. |
| 2013/0040136 | A1* | 2/2013 | Siebert ................... B41M 5/24 428/354 |
| 2014/0027739 | A1 | 1/2014 | van de Weijer et al. |
| 2016/0024329 | A1* | 1/2016 | Zhang ................... C09D 11/02 522/64 |
| 2016/0288479 | A1 | 10/2016 | Shuey et al. |
| 2018/0231688 | A1 | 8/2018 | Byun et al. |
| 2018/0239248 | A1* | 8/2018 | Ha ................... G03G 5/14708 |
| 2018/0312697 | A1* | 11/2018 | Gotou ................... C09D 4/00 |

FOREIGN PATENT DOCUMENTS

| | | |
|---|---|---|
| JP | H02120042 A | 5/1990 |
| JP | H5333784 A | 12/1993 |
| JP | 2003114621 A | 4/2003 |
| JP | 2010094984 A | 4/2010 |
| JP | 2011020374 A | 2/2011 |
| JP | 2013039829 A | 2/2013 |
| JP | 2015113415 A | 6/2015 |
| JP | 2015143019 A | 8/2015 |
| JP | 2018512308 A | 5/2018 |
| KR | 20060027501 A | 3/2006 |
| KR | 101053298 B1 | 8/2011 |
| KR | 101072737 B1 | 10/2011 |
| KR | 20130018625 A | 2/2013 |
| KR | 20170046468 A | 5/2017 |
| KR | 20170052479 A | 5/2017 |
| KR | 20170116902 A | 10/2017 |
| KR | 20170116903 A | 10/2017 |
| KR | 20170116989 A | 10/2017 |
| WO | 2016160410 A1 | 10/2016 |

OTHER PUBLICATIONS

Chinese Search Report for Application No. 201880019106.2 dated Dec. 8, 2020, 4 pages.

* cited by examiner

MULTILAYER MARKING FILM

CROSS-REFERENCE TO RELATED APPLICATIONS

The present specification application is a national phase entry under 35 U.S.C. § 371 of International Application No. PCT/KR2018/006289, filed on Jun. 1, 2018, which claims priority from Korean Patent Application No. 10-2017-0068598, filed on Jun. 1, 2017, the contents of which are incorporated by reference herein.

TECHNICAL FIELD

The present specification claims priority to and the benefit of Korean Patent Application No. 10-2017-0068598 filed in the Korean Intellectual Property Office on Jun. 1, 2017, the entire contents of which are incorporated herein by reference.

The present invention relates to a multilayer marking film on which various information is displayed through laser etching.

BACKGROUND ART

Various articles have labels for an inherent discriminant function. These labels include various information on an article, and also perform an inherent discriminant function. For example, the labels used in the automobile industry display information on various parts of a vehicle, such as tire pressure or a fuel type, or are used in order to display inherent security information such as a chassis number and a vehicle identification number. The label makes it possible to track a vehicle in the theft of the vehicle or the accident of the vehicle.

As an example of a method of preparing the label, there is a method of writing information on a label by using light irradiation means such as a laser. The laser is easily used as a high power light source in machine processing. For example, Korean Patent Application Laid-Open No. 10-2006-0027501 discloses an adhesive label sheet capable of marking a large amount of barcodes in a short period of time by using a laser. Further, Japanese Patent Application Laid-Open No. 1990-120042 discloses a heat-resistant display material having a layer to be marked on which an etching pattern is formed on a heat-resistant base layer by a laser beam.

In order for the label to be used for theft prevention, the label needs to be crushed upon detachment after a certain period of time has elapsed from the time point when the label was attached. That is, the label needs to retain friability. In addition, when scratches are formed by scratches and the like on the surface of the label, information on an article and an inherent discriminant function significantly deteriorate, and as a result, there is a need for studies in order to prevent the deterioration.

DETAILED DESCRIPTION OF THE INVENTION

Technical Problem

Thus, the present invention has been made in an effort to provide a marking film in which various information can be written and a theft prevention function can be realized.

However, a problem to be solved by the present invention is not limited to the aforementioned problem, and the other problems that are not mentioned may be clearly understood by a person skilled in the art from the following description.

Technical Solution

An exemplary embodiment of the present invention provides a multilayer marking film including: an adhesive layer; a colored base layer having a first color; and a colored coating layer having a second color different from the first color, in which the colored coating layer, the colored base layer, and the adhesive layer are sequentially provided, the colored base layer includes a cured material of a base composition including a urethane (meth)acrylate oligomer, a (meth)acrylate monomer, and a pigment, and the colored coating layer includes an uneven portion and is etched by laser irradiation.

Advantageous Effects

A multilayer marking film according to an exemplary embodiment of the present invention can realize fine and various letters, designs, and the like through an uneven portion included in a colored coating layer.

The multilayer marking film according to an exemplary embodiment of the present invention includes a colored coating layer having an uneven portion, thereby easily writing additional letters, designs, and the like through laser etching.

The multilayer marking film according to an exemplary embodiment of the present invention includes a protective layer and thus has advantages in that it is possible to prevent scratches caused by external friction, and the like and to restore damage caused by external friction, and the like.

The effects of the present invention are not limited to the above-described effects, and effects, which are not mentioned, will be clearly understood by a person skilled in the art from the specification of the present application and the accompanying drawings.

BEST MODE

Throughout the specification of the present application, when one member is disposed "on" another member, this includes not only a case where the one member is brought into contact with another member, but also a case where still another member is present between the two members.

When one part "includes" one constituent element throughout the present specification, unless otherwise specifically described, this does not mean that another constituent element is excluded, but means that another constituent element may be further included.

Throughout the present specification, the "(meth)acrylate" means "acrylate" or "methacrylate".

Throughout the present specification, the "marking" means that information is written on a film by etching by laser irradiation.

Throughout the present specification, the 'friability' means a physical property in which when a multilayer marking film is attached to an adherend, and then an attempt to detach or remove the film is made, the original form of the film is destroyed, and as a result, the multilayer marking film cannot be recycled.

Throughout the present specification, the unit "parts by weight" means a ratio of the weights between the respective components.

Throughout the specification of the present application, "a weight average molecular weight" of a compound may be calculated by using a molecular weight and a molecular weight distribution of the compound. Specifically, a sample specimen in which a concentration of the compound is 1 wt % is prepared by putting tetrahydrofuran (THF) and the compound into a 1-ml glass bottle, a standard specimen (polystyrene) and the sample specimen are filtered through a filter (pore size of 0.45 mm), and then the elution time of the sample specimen is compared with the calibration curve of the standard specimen by injecting the specimens into a GPC injector, thereby obtaining the molecular weight and the molecular weight distribution of the compound. In this case, Infinity II 1260 (manufactured by Agilent Inc.) may be used as a measuring apparatus, and the flow rate and the column temperature may be set to 1.00 mL/min and 40.0° C., respectively.

Hereinafter, the present specification will be described in more detail.

An exemplary embodiment of the present invention provides a multilayer marking film including: an adhesive layer; a colored base layer having a first color; and a colored coating layer having a second color different from the first color, in which the colored coating layer, the colored base layer, and the adhesive layer are sequentially provided, the colored base layer includes a cured material of a base composition including a urethane (meth)acrylate oligomer, a (meth)acrylate monomer, and a pigment, and the colored coating layer includes an uneven portion and is etched by laser irradiation.

According to an exemplary embodiment of the present invention, the multilayer marking film can realize fine and various letters, designs, and the like through an uneven portion provided on the surface of a colored coating layer.

Figure 1:
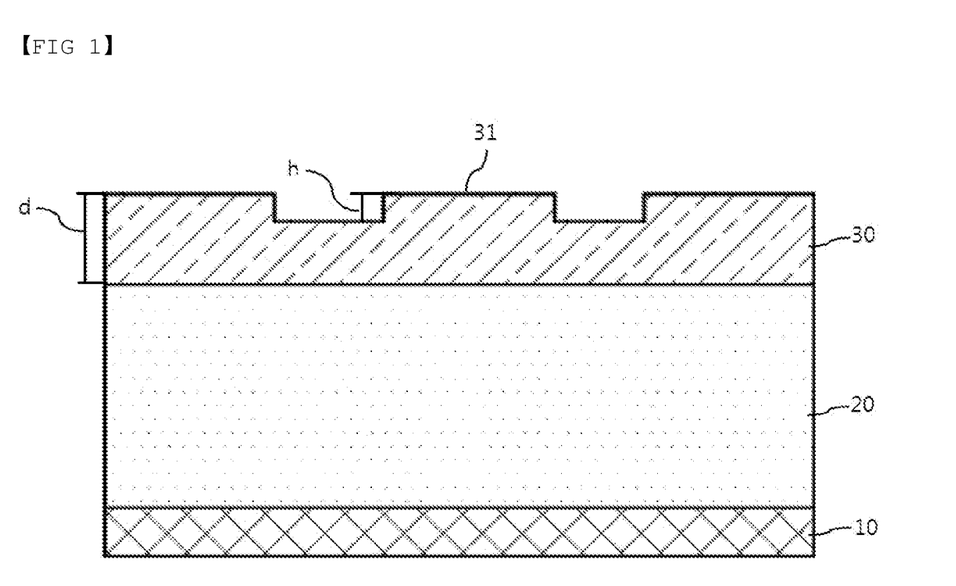
FIG. 1 is a view illustrating a multilayer marking film according to an exemplary embodiment of the present invention.

FIG. 1 is a view illustrating a multilayer marking film according to an exemplary embodiment of the present invention. Specifically, FIG. 1 illustrates a multilayer marking film 100 including an adhesive layer 10, a colored base layer 20, and a colored coating layer 30, in which the colored coating layer 30, the colored base layer 20, and the adhesive layer 10 are sequentially provided. More specifically, according to FIG. 1, in the multilayer marking film, the colored base layer 20 may be provided under the colored coating layer 30, and the adhesive layer 10 may be provided under the colored base layer 20.

According to an exemplary embodiment of the present invention, both the colored base layer and the colored coating layer are layers having a color, and the "colored" may mean that the base layer or the coating layer is not transparent, and has a color such as, for example, white, black, and blue. Specifically, the colored base layer has a first color, the colored coating layer has a second color, and the first color and the second color are different from each other.

According to an exemplary embodiment of the present invention, the colored base layer includes a cured material of a base composition including: a urethane (meth)acrylate oligomer; a (meth)acrylate monomer; and a pigment. That is, the base composition may be a composition for forming a colored base layer. The urethane (meth)acrylate oligomer included in the base composition may include a urethane bond (—NHCOO—) in the molecule thereof. Further, a weight average molecular weight of the urethane (meth) acrylate oligomer included in the base composition may be easily adjusted. That is, by using a base composition including the urethane (meth)acrylate oligomer, the multilayer marking film may have improved friability, and simultaneously, the elongation thereof may be easily adjusted. In addition, when the urethane (meth)acrylate oligomer is included in the base composition, there is an advantage in that an attaching strength between the colored base layer and the adhesive layer and between the colored base layer and the colored coating layer is excellent.

According to an exemplary embodiment of the present invention, the urethane (meth)acrylate oligomer may be obtained from an isocyanate compound including three to six isocyanate groups and a hydroxyl group-containing (meth)acrylate compound, such as hydroxyethyl (meth) acrylate, hydroxypropyl (meth)acrylate, and hydroxybutyl (meth)acrylate.

According to an exemplary embodiment of the present invention, the urethane (meth)acrylate oligomer included in the base composition may have a weight average molecular weight of 2,000 g/mol or more and 10,000 g/mol or less. Specifically, the urethane (meth)acrylate oligomer may have a weight average molecular weight of 2,000 g/mol or more and 8,000 g/mol or less, or 2,000 g/mol or more and 5,000 g/mol or less. When the weight average molecular weight of the urethane (meth)acrylate oligomer is within the above-described range, the cured material of the base composition may have a dense cured structure, and the colored base layer may have an excellent interfacial attachment property between the adhesive layer and the colored coating layer. Furthermore, it is possible to control the friability, tensile strength, and elongation of the colored base layer including the cured material of the base composition by adjusting the weight average molecular weight of the urethane (meth) acrylate oligomer within the above-described range. Accordingly, mechanical properties of the multilayer marking film may be effectively controlled.

According to an exemplary embodiment of the present invention, the urethane (meth)acrylate oligomer may include three to six (meth)acrylate groups. Specifically, the urethane (meth)acrylate oligomer may include: a urethane (meth) acrylate oligomer including three to four (meth)acrylate groups; a urethane (meth)acrylate oligomer including five to six (meth)acrylate groups; or a mixture thereof.

The urethane (meth)acrylate oligomer including three (meth)acrylate groups or the urethane (meth)acrylate oligomer including four (meth)acrylate groups may impart excellent friability to the colored base layer as a curing reaction with the (meth)acrylate monomer is carried out. Further, the urethane (meth)acrylate oligomer including five (meth)acrylate groups or the urethane (meth)acrylate oligomer including six (meth)acrylate groups may impart excellent friability and mechanical properties to the colored base layer as a curing reaction is carried out in the oligomer itself. In addition, when a urethane (meth)acrylate oligomer in which a urethane (meth)acrylate oligomer including three to four (meth)acrylate groups and a urethane (meth)acrylate oligomer including five to six (meth)acrylate groups are mixed is used, the friability and durability of the colored base layer may be more improved.

According to an exemplary embodiment of the present invention, the (meth)acrylate monomer included in the base composition may include at least one of a cyclo-aliphatic (meth)acrylate monomer, an epoxy-based (meth)acrylate monomer, a chained-aliphatic (meth)acrylate monomer, and a polyol-based (meth)acrylate monomer. The (meth)acrylate monomer including the monomer having the above-described chemical structure may interact with the urethane (meth)acrylate oligomer, thereby greatly improving the friability of the multilayer marking film.

According to an exemplary embodiment of the present invention, the (meth)acrylate monomer included in the base composition may have a weight average molecular weight of 200 g/mol or more and 500 g/mol or less. Specifically, the (meth)acrylate monomer may have a weight average molecular weight of 200 g/mol or more and 400 g/mol or less. The (meth)acrylate monomer may include at least one of a cyclo-aliphatic (meth)acrylate monomer, an epoxy-based (meth)acrylate monomer, a chained-aliphatic (meth)acrylate monomer, and a polyol-based (meth)acrylate monomer. Further, the monomers included in the (meth)acrylate monomer may each independently have a weight average molecular weight of 200 g/mol or more and 500 g/mol or less. For example, when the (meth)acrylate monomer includes a cyclo-aliphatic (meth)acrylate monomer and a chained-aliphatic (meth)acrylate monomer, the cyclo-aliphatic (meth)acrylate monomer and the chained-aliphatic (meth)acrylate monomer may each have a weight average molecular weight of 200 g/mol or more and 500 g/mol or less.

According to an exemplary embodiment of the present invention, the (meth)acrylate monomer having a weight average molecular weight within the above-described range may be cross-linked via a curing reaction with the urethane (meth)acrylate oligomer, which serves as a matrix, and accordingly, it is possible to realize a colored base layer which is dense and has high hardness.

According to an exemplary embodiment of the present invention, the (meth)acrylate monomer may include two to four (meth)acrylate groups. The (meth)acrylate monomer may include at least one of a cyclo-aliphatic (meth)acrylate monomer, an epoxy-based (meth)acrylate monomer, a chained-aliphatic (meth)acrylate monomer, and a polyol-based (meth)acrylate monomer. Furthermore, the monomers included in the (meth)acrylate monomer may each independently include two to four (meth)acrylate groups. Further, the (meth)acrylate group which the (meth)acrylate monomer includes may be a photoreactive functional group.

According to an exemplary embodiment of the present invention, the (meth)acrylate monomer including two to four (meth)acrylate groups may be cured with the urethane (meth)acrylate oligomer. Accordingly, the friability of the colored base layer may be effectively improved.

According to an exemplary embodiment of the present invention, the cyclo-aliphatic (meth)acrylate monomer may mean a (meth)acrylate monomer including a cyclic hydrocarbon in an aliphatic hydrocarbon. The cyclo-aliphatic (meth)acrylate monomer may include at least one substituent of a cycloalkyl group having 3 to 25 carbon atoms and a heterocycloalkyl group having 2 to 25 carbon atoms. The heterocycloalkyl group having 2 to 25 carbon atoms may include at least one of nitrogen, sulfur, and oxygen. When the cyclo-aliphatic (meth)acrylate monomer including a heterocycloalkyl group is used, the friability of the colored base layer may be more improved. In addition, the base composition may include a cyclo-aliphatic (meth)acrylate monomer containing the heterocycloalkyl group, thereby increasing a curing reaction rate of the base composition. Specifically, the cyclo-aliphatic (meth)acrylate monomer may include at least one of cyclohexanedimethanol diacrylate, tricyclodecane dimethanol diacrylate, and adamantane diol diacrylate.

According to an exemplary embodiment of the present invention, the epoxy-based (meth)acrylate monomer may include at least one of a novolac type epoxy (meth)acrylate, a bisphenol-A type epoxy (meth)acrylate, a bisphenol-S type epoxy (meth)acrylate, a bisphenol-F type epoxy (meth)acrylate, a phenol type epoxy (meth)acrylate, and a cresol novolac type epoxy (meth)acrylate.

In addition, the chained-aliphatic (meth)acrylate monomer may be a compound having a (meth)acrylate group bonded to a main chain composed of an alkylene structural unit having 2 to 16 carbon atoms. The chained-aliphatic (meth)acrylate monomer may mean a (meth)acrylate monomer including a chained hydrocarbon, except for a cyclic hydrocarbon in an aliphatic hydrocarbon. Furthermore, the chained hydrocarbon may be one substituted with oxygen, and the like. Specifically, the chained-aliphatic (meth)acrylate monomer may include at least one of 1,6-hexanediol di(meth)acrylate, 1,3-butanediol di(meth)acrylate, and 1,4-butanediol di(meth)acrylate.

According to an exemplary embodiment of the present invention, the polyol-based (meth)acrylate monomer may include at least one of 1,6-hexanediol(ethoxylate)diacrylate, tripropylene glycol diacrylate, dipropylene glycol diacrylate, triethylene glycol diacrylate, and tetraethylene glycol diacrylate.

According to an exemplary embodiment of the present invention, as the number of functional groups of the urethane (meth)acrylate oligomer and the (meth)acrylate monomer and the weight average molecular weights thereof are adjusted to appropriate ranges, mechanical properties of the multilayer marking film such as friability, tensile strength, and elongation may be improved.

According to an exemplary embodiment of the present invention, the content of the (meth)acrylate monomer included in the base composition may be more than 0 part by weight and 66 parts by weight or less, based on 100 parts by weight of the urethane (meth)acrylate oligomer. Specifically, the content of the (meth)acrylate monomer may be 5 parts by weight to 40 parts by weight, 5 parts by weight to 30 parts by weight, or 25 parts by weight to 40 parts by weight, based on 100 parts by weight of the urethane (meth)acrylate oligomer.

According to an exemplary embodiment of the present invention, the friability of the colored base layer may be improved by adjusting the content of the (meth)acrylate monomer to the above-described range. Furthermore, within the above-described content range of the (meth)acrylate monomer, the hardness and elongation of a cured material of the base composition may be improved, and accordingly, the durability and workability of the colored base layer may be improved.

Accordingly, according to an exemplary embodiment of the present invention, the friability, durability, and workability of the multilayer marking film may be improved by adjusting the content of the (meth)acrylate monomer to the above-described range. Further, the multilayer marking film is applied to adherends having various forms, thereby performing an inherent discriminant function and functions of preventing theft and forgery.

According to an exemplary embodiment of the present invention, the base composition includes a pigment as a component for imparting a color to the colored base layer. The pigment is not limited in type, and depending on the color of the colored base layer, a single pigment may be used or various pigments may be mixed and used. According to an exemplary embodiment of the present invention, the pigment may include at least one of titanium dioxide ($TiO_2$), carbon black, iron and stone, an azo-based pigment, cobalt violet, cadmium sulfide, chromate, ferrocyanide, silicate, phosphate, a phthalocyanine-based compound, and a dioxazine-based compound.

According to an exemplary embodiment of the present invention, the content of the pigment included in the base composition may be 50 parts by weight to 135 parts by weight based on 100 parts by weight of the urethane (meth)acrylate oligomer. Specifically, the content of the pigment may be 70 parts by weight to 100 parts by weight based on 100 parts by weight of the urethane (meth)acrylate oligomer.

By adjusting the content of the pigment to the above-described range, it is possible to effectively prevent a problem in that an effect of the colored base layer deteriorates in terms of color contrast with the colored coating layer and a problem in that the friability of the colored base layer deteriorates. In addition, when the content range of the pigment is within the above-described range, it is possible to suppress the curing process reaction efficiency of the base composition from deteriorating, and the colored base layer may have an appropriate interfacial attachment property and friability.

Accordingly, according to an exemplary embodiment of the present invention, by adjusting the content of the pigment included in the base composition to the above-described range, the color of the colored base layer may be effectively realized at the same time without degrading mechanical properties of the colored base layer.

According to an exemplary embodiment of the present invention, the base composition may be cured by an electron beam or UV rays. That is, the cured material of the base composition may be an electron beam cured material or a UV ray-cured material. When the base composition is cured by using heat or other curing means, the curing slowly proceeds due to a small amount of energy. That is, when other curing means are used, there may occur a problem in that the friability of the colored base layer deteriorates and the elongation thereof is extremely increased, and as a result, target physical properties cannot be realized. In contrast, according to an exemplary embodiment of the present invention, the friability of the colored base layer to be manufactured may be easily secured by curing the base composition using an electron beam or UV rays capable of instantaneously applying a large amount of energy.

According to an exemplary embodiment of the present invention, when the base composition is cured by UV rays, the base composition may further include a photoinitiator. As the photoinitiator, a publicly-known material capable of initiating photocuring of the base composition by UV irradiation may be used. In contrast, when the base composition is cured by an electron beam, the base composition may not include a separate photoinitiator.

According to an exemplary embodiment of the present invention, the base composition may be cured by using an electron beam having energy of 20 kGy to 80 kGy. Furthermore, the base composition may be cured by irradiating a UV ray having a wavelength value of 200 nm to 450 nm.

The friability of the colored base layer at a target level may be secured by curing the base composition using an electron beam having energy within the range or a UV ray having a wavelength value within the range.

According to an exemplary embodiment of the present invention, the interface between the colored base layer and the colored coating layer may retain an appropriate interfacial attachment property such that the colored coating layer is removed from the colored base layer by a marking by laser irradiation, and as a result, letters and designs with a fine width may be written. Further, the interface between the colored base layer and the adhesive layer may have an interfacial attachment property such that the multilayer marking film may be applied to and firmly attached to a final article to realize long-term durability.

According to an exemplary embodiment of the present invention, the colored base layer may have a thickness of 50 μm to 150 μm. By adjusting the thickness of the colored base layer to the above-described range, the colored base layer may have excellent durability during the marking by laser irradiation, and accordingly, the multilayer marking film may have improved friability. In addition, when the thickness of the colored base layer is within the above-described range, the distribution or handling of the multilayer marking film is facilitated, and when the multilayer marking film is processed to a desired size, punching properties by laser irradiation may be improved.

According to an exemplary embodiment of the present invention, the colored coating layer may include a photo-cured material of a coating composition including: a photocurable mixed oligomer including a trifunctional urethane (meth)acrylate oligomer and a difunctional urethane (meth)acrylate oligomer; a photoinitiator; a dispersant; and a pigment. That is, the coating composition may be a composition for forming a colored coating layer.

According to an exemplary embodiment of the present invention, the trifunctional urethane (meth)acrylate oligomer may be an oligomer having three (meth)acrylate groups in one molecule, and the difunctional urethane (meth)acrylate oligomer may be an oligomer having two (meth)acrylate groups in one molecule. Furthermore, each of the trifunctional urethane (meth)acrylate oligomer and the difunctional urethane (meth)acrylate oligomer may be cured by light irradiation. The coating composition including the photocurable mixed oligomer may provide a colored coating layer having excellent chemical resistance and scratch resistance as compared to a thermosetting composition including a thermosetting oligomer. That is, the coating composition may not include a thermosetting component. Specifically, the coating composition may not include a thermosetting oligomer as a base component.

According to an exemplary embodiment of the present invention, the trifunctional urethane (meth)acrylate oligomer and the difunctional urethane (meth)acrylate oligomer may include a urethane bond (—NHCOO—) in the molecule thereof. Further, the coating composition including the photocurable mixed oligomer may realize a colored coating layer having excellent optical characteristics and appropriate hardness.

According to an exemplary embodiment of the present invention, the trifunctional urethane (meth)acrylate oligomer may have a weight average molecular weight of 1,500 g/mol to 3,500 g/mol, and the difunctional urethane (meth)acrylate oligomer may have a weight average molecular weight of 1,000 g/mol to 3,000 g/mol. The coating composition including the trifunctional urethane (meth)acrylate oligomer and the difunctional urethane (meth)acrylate oligomer, which have a weight average molecular weight within the above-described range, may have physical properties appropriate for transfer coating. In addition, the colored coating layer formed therefrom may have precise laser markability and chemical resistance.

According to an exemplary embodiment of the present invention, the weight ratio of the trifunctional urethane (meth)acrylate oligomer and the difunctional urethane (meth)acrylate oligomer included in the photocurable mixed oligomer may be 9:1 to 8:2. Specifically, the weight ratio of the trifunctional urethane (meth)acrylate oligomer and the difunctional urethane (meth)acrylate oligomer included in the photocurable mixed oligomer may be 9:1 to 8.5:1.5.

By adjusting the weight ratio of the trifunctional urethane (meth)acrylate oligomer and the difunctional urethane (meth)acrylate oligomer to the above-described range, it is possible to prevent transfer coating properties of the coating composition from deteriorating and to effectively suppress chemical resistance and scratch resistance of the colored coating layer from deteriorating. Furthermore, when the weight ratio of the trifunctional urethane (meth)acrylate oligomer and the difunctional urethane (meth)acrylate oligomer is within the above-described range, the pigment may be prevented from aggregating in the coating composition, and transfer coating properties of the coating composition may be improved.

According to an exemplary embodiment of the present invention, the chemical resistance of the colored coating layer and the marking processability by laser irradiation may be improved by adjusting the content of each of the components included in the coating composition.

According to an exemplary embodiment of the present invention, the content of the photocurable mixed oligomer may be 50 parts by weight to 95 parts by weight based on 100 parts by weight of the solid content of the coating composition. Specifically, the coating composition may include the photocurable mixed oligomer in an amount of 60 parts by weight to 90 parts by weight, or 70 parts by weight to 85 parts by weight, based on 100 parts by weight of the solid content. By adjusting the content of the photocurable mixed oligomer to the above-described range, the coating composition may secure a viscosity suitable for coating, and may have appropriate hardness after the photocuring. Further, the colored coating layer including the cured material of the coating composition may have excellent chemical resistance and durability.

According to an exemplary embodiment of the present invention, the coating composition may include a dispersant and a pigment together with the photocurable mixed oligomer. The coating composition includes a dispersant, so that the colored coating layer may realize an overall uniform color distribution, and the efficiency of the curing and coating processes may be improved in the process of forming the colored coating layer. The dispersant allows the pigment to be uniformly dispersed in the coating composition, and may be appropriately selected among those having excellent compatibility with the photocurable mixed oligomer and the pigment.

According to an exemplary embodiment of the present invention, the dispersant may include at least one of a polyurethane-based dispersant, an acrylic block copolymer dispersant, and a modified polyacrylate-based dispersant. Specifically, the dispersant may be an acrylic block copolymer dispersant having excellent compatibility with the photocurable mixed oligomer and the pigment, and these dispersants may uniformly realize the color distribution of the colored coating layer by uniformly distributing the pigment in the coating composition. Further, the acrylic block copolymer may be formed by a block copolymerization reaction of a mixed monomer component including at least one of acrylonitrile, isoprene, styrene, and butadiene.

According to an exemplary embodiment of the present invention, the coating composition may include the dispersant in an amount of 1 part by weight to 20 parts by weight, specifically, 2 parts by weight to 10 parts by weight, based on 100 parts by weight of the solid content. By adjusting the content of the dispersant to the above-described range, the pigment may have improved dispersibility in the coating composition, and the coating composition may have high curing efficiency. In addition, when the content of the dispersant is within the above-described range, an effect of improving dispersibility as compared to preparation costs of the coating composition may be excellent.

According to an exemplary embodiment of the present invention, the coating composition includes a pigment for realizing a color, and the pigment may be appropriately selected among those capable of allowing the colored base layer and the colored coating layer to have different colors from each other. The pigment may include at least one of titanium dioxide ($TiO_2$), carbon black, iron and stone, an azo-based pigment, cobalt violet, cadmium sulfide, chromate, ferrocyanide, silicate, phosphate, a phthalocyanine-based compound, and a dioxazine-based compound.

According to an exemplary embodiment of the present invention, the colored base layer and the colored coating layer may realize different colors from each other by including different pigments from each other. Specifically, the colored base layer may exhibit white by including titanium dioxide ($TiO_2$) as a pigment, and the colored coating layer may exhibit black by including carbon black as a pigment. Further, the colored base layer and the colored coating layer may also realize different colors from each other by adjusting the contents of the pigment even though the colored base layer and the colored coating layer include the same pigment.

According to an exemplary embodiment of the present invention, when carbon black is used as a pigment included in the coating composition, the carbon black may have a particle diameter of more than 0 nm and 30 nm or less. Specifically, the carbon black may have a particle diameter of 10 nm to 30 nm. The particle diameter of the carbon black may be measured as a projected diameter when the carbon black is projected by light irradiated in parallel with each other in a predetermined direction.

In addition, by using carbon black having a particle diameter within the above-described range as a pigment, the coatability of the coating composition may be improved, and the colored coating layer may realize excellent surface properties. Accordingly, it is possible to effectively prevent the visibility of the colored coating layer from deteriorating.

According to an exemplary embodiment of the present invention, the coating composition may include the pigment in an amount of 5 parts by weight to 70 parts by weight, specifically, 5 parts by weight to 20 parts by weight, based on 100 parts by weight of the solid content. When the content of the pigment is within the above-described range, the coating composition may simultaneously secure excellent dispersibility and high curing efficiency. Further, since a color having a chroma at a level required for the colored coating layer may be realized within the content range of the pigment, the marking precision of the multilayer marking film by laser irradiation may be improved.

Furthermore, when the content of the pigment and the content of the dispersant are together within the above-described ranges, the dispersibility and curing efficiency of the coating composition may be effectively improved, and defects of a coating layer occurring due to aggregation of particles and the like during the coating may be effectively prevented.

According to an exemplary embodiment of the present invention, the coating composition may include a photoinitiator, and the photoinitiator may serve as a catalyst which initiates a photocuring reaction by light irradiation. Specifically, the photoinitiator may include at least one of a benzophenone-based initiator, an α-hydroxyketone-based initiator, a phenylglyoxylate-based initiator, a benzyldimethyl-ketal-based initiator, an α-aminoketone-based initiator, a monoacylphosphine-based initiator, a bisacrylphosphine-based initiator, a bisacylphosphine-based initiator, a phosphine oxide-based initiator, a metallocene-based initiator, and an iodonium salt-based initiator.

According to an exemplary embodiment of the present invention, the photoinitiator may include a bisacrylphosphine-based initiator, thereby easily coating the coating composition by using a transfer coating method. Specifically, the photoinitiator may not include an α-hydroxyketone-based initiator simultaneously while including a bisacrylphosphine-based initiator. Accordingly, the coating composition may be effectively coated on one surface of the colored base layer by a transfer coating method.

According to an exemplary embodiment of the present invention, the coating composition may include the photoinitiator in an amount of 1 part by weight to 10 parts by weight based on 100 parts by weight of the solid content. By adjusting the content of the photoinitiator to the above-described range, the photocuring efficiency of the coating composition may be improved, and the coating composition may be cured so as to have an appropriate cure degree.

According to an exemplary embodiment of the present invention, an uneven portion may be provided on the surface of the colored coating layer. In the present invention, the "uneven portion" is differentiated from a portion of a colored coating layer etched by laser irradiation, and the uneven portion is formed on the surface of the colored coating layer before the colored coating layer is etched by laser irradiation.

According to an exemplary embodiment of the present invention, it is possible to prepare a colored coating layer having an uneven portion provided on the surface thereof by a general method used in the art. For example, by irradiating the surface of a colored coating layer having a flat surface with light such as a laser, an uneven portion may be formed on the surface of the colored coating layer. In addition, the uneven portion may be formed in the form of an intaglio or in the form of an emboss, and the plurality of uneven portions may be formed on the surface of the colored coating layer.

According to an exemplary embodiment of the present invention, the multilayer marking film may realize a background with various patterns through an uneven portion included in the colored coating layer. Further, an uneven portion may be formed in the form of a design, a letter, and a logo, thereby providing a multilayer marking film which may perform various functions in terms of design and merchantability.

Accordingly, according to an exemplary embodiment of the present invention, the multilayer marking film can easily realize fine and various letters, designs, and the like through an uneven portion included in a colored coating layer.

According to an exemplary embodiment of the present invention, the uneven portion may be provided by 2% to 50% of the thickness of the colored coating layer from the surface of the colored coating layer in a direction adjacent to the colored base layer on the surface of the colored coating layer. That is, the thickness of the uneven portion may be 2% to 50% of the thickness of the colored coating layer from the surface of the colored coating layer in a direction adjacent to the colored base layer on the surface of the colored coating layer. In this case, the surface of the colored coating layer may mean a surface of a colored coating layer before an uneven portion is provided.

The colored coating layer is etched by a laser, so that an uneven portion may be formed on the surface of the colored coating layer. Specifically, the colored coating layer is etched by a laser by 2% to 50% of the thickness of the colored coating layer from the surface of the colored coating layer, so that the uneven portion may be provided by 2% to 50% of the thickness of the colored coating layer from the surface of the colored coating layer in a direction adjacent to the colored base layer on the surface of the colored coating layer. In addition, the colored coating layer may be etched by a laser by 5% or more and 30% or less or 10% or more and 25% or less of the thickness of the colored coating layer from the surface of the colored coating layer, thereby forming an uneven portion on the surface of the colored coating layer.

Accordingly, a ratio of the thickness of the colored coating layer to the thickness of the uneven portion may be 1:0.02 to 1:0.5. Furthermore, the plurality of uneven portions may be formed on the surface of the colored coating layer, and the thicknesses of the plurality of formed uneven portions may be the same as or different from each other. Further, when the thicknesses of the plurality of uneven portions are different from each other, the thickness of the uneven portion may be an arithmetic average of the thicknesses of the plurality of uneven portions.

According to an exemplary embodiment of the present invention, it is possible to effectively prevent the durability of a colored coating layer having the uneven portion from deteriorating by adjusting the thickness of the uneven portion to the above-described range. In addition, when the thickness of the uneven portion is within the above-described range, various designs, logos, and the like may be simultaneously realized on the multilayer marking film without degrading the visibility of information additionally written on a colored coating layer having an uneven portion through laser irradiation.

According to an exemplary embodiment of the present invention, the colored coating layer may have a thickness of 2 μm to 4 μm. Referring to FIG. 1, by adjusting a thickness (d) of the colored coating layer to the above-described range, the efficiency of a marking by laser irradiation may be improved, and an etched colored coating layer may be cleanly removed from the colored base layer. Accordingly, even after the multilayer marking film is marked by laser irradiation, excellent visibility of the written information may be realized.

Referring to FIG. 1, by etching 0.1 μm to 1 μm of the colored coating layer having a thickness of 2 μm to 4 μm from the surface of the colored coating layer by a laser, an uneven portion 31 having a thickness (h) of 0.1 μm to 1 μm may be formed on the surface of the colored coating layer. By etching 0.1 μm to 1 μm of the colored coating layer from the surface thereof by a laser, it is possible to prevent the visibility of letters, designs, and the like realized through the uneven portion from deteriorating, and to prevent the durability of the colored coating layer from deteriorating.

Figure 2:
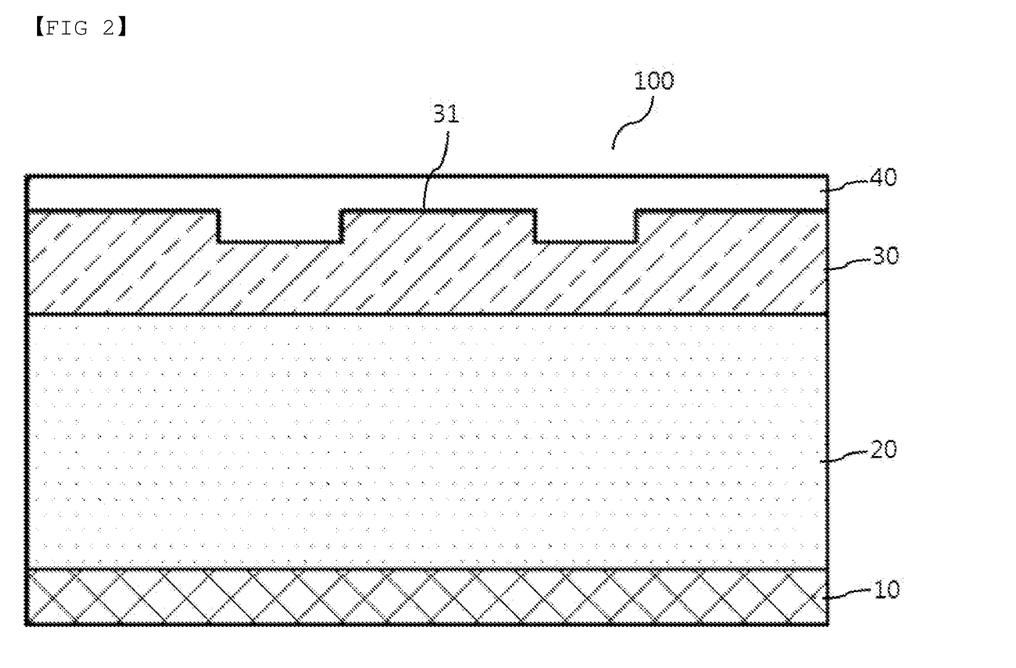
FIG. 2 is a view illustrating a multilayer marking film including a protective layer according to an exemplary embodiment of the present invention.

FIG. 2 is a view illustrating a multilayer marking film including a protective layer according to an exemplary embodiment of the present invention. FIG. 2 is a view illustrating a multilayer marking film 100 including an adhesive layer 10, a colored base layer 20, a colored coating layer 30 having an uneven portion 31, and a protective layer 40, in which the adhesive layer 10, the colored base layer 20, the colored coating layer 30, and the protective layer 40 are sequentially provided. Specifically, the colored base layer 20 may be provided on top of the adhesive layer 10, the colored coating layer 30 may be provided on top of the colored base layer 20, and the protective layer 40 may be provided on top of the colored coating layer 30.

Referring to FIG. 2, the protective layer 40 may be provided on top of the colored coating layer 30 including the uneven portion 31. Specifically, the protective layer 40 may be formed on top of the colored coating layer 30 having the uneven portion 31 by applying and curing the photocurable composition on the colored coating layer 30 having the uneven portion 31 provided on the surface thereof.

According to an exemplary embodiment of the present invention, the multilayer marking film may further include a protective layer provided on one surface of the colored coating layer, and the protective layer may include a cured material of a photocurable composition including a photocurable urethane (meth)acrylate resin, a photocurable (meth)acrylate monomer, and an inorganic nanoparticle. That is, the photocurable composition may be a composition for forming a protective layer.

According to an exemplary embodiment of the present invention, since the multilayer marking film may include a protective layer retaining excellent scratch resistance and self-restorability, it is possible to simultaneously realize effects of excellent self-restorability, scratch prevention, and scratch resistance. The self-restorability may mean that when surface damage such as scratches occurs on the protective layer, the surface of the protective layer is recovered to the original surface state while scratch marks disappear after a predetermined time elapses.

Accordingly, the multilayer marking film including the protective layer may prevent scratches caused by external friction or be recovered, and simultaneously, may realize an information delivery function by performing a laser irradiation marking on a colored coating layer.

According to an exemplary embodiment of the present invention, the photocurable urethane (meth)acrylate resin may include a polyfunctional urethane (meth)acrylate resin. The photocurable urethane (meth)acrylate resin may include a polyfunctional urethane (meth)acrylate resin including two or more (meth)acrylate groups. Specifically, the polyfunctional urethane (meth)acrylate resin may include 2 to 15 of (meth)acrylate groups. By using a polyfunctional urethane (meth)acrylate resin including (meth)acrylate groups within the above-described range, it is possible to improve an effect of preventing wrinkles of the protective layer and hardness of the protective layer.

According to an exemplary embodiment of the present invention, the photocurable urethane (meth)acrylate resin included in the photocurable composition may have a glass transition temperature of 10° C. to 30° C. The photocurable composition including a photocurable urethane (meth)acrylate resin of which the glass transition temperature satisfies the above-described range may realize a protective layer having excellent flexibility and self-restorability.

According to an exemplary embodiment of the present invention, the photocurable urethane (meth)acrylate resin may include at least one of a urethane silicone acrylate resin, a urethane (meth)acrylate resin, and a bisphenol F-urethane diacrylate resin. At the time of photocuring the photocurable composition, the photocurable urethane (meth)acrylate resin may form a basic structure of the protective layer.

Furthermore, when the photocurable urethane (meth)acrylate resin includes a urethane silicone acrylate resin, a dense crosslinking structure may be formed as the photocurable composition is photocured. Accordingly, the protective layer can realize excellent surface hardness and chemical resistance. Further, since the urethane silicone acrylate resin includes silicone, the protective layer may serve to prevent scratches.

According to an exemplary embodiment of the present invention, the content of the photocurable urethane (meth)acrylate resin may be 10 parts by weight to 80 parts by weight based on 100 parts by weight of the solid content of the photocurable composition. Specifically, the content of the photocurable urethane (meth)acrylate resin may be 30 parts by weight to 75 parts by weight based on 100 parts by weight of the solid content of the photocurable composition. By adjusting the content of the photocurable urethane (meth)acrylate resin to the above-described range, it is possible to prevent the surface hardness and flexibility of the protective layer from deteriorating, and to improve an effect of preventing wrinkles of the protective layer.

According to an exemplary embodiment of the present invention, the photocurable composition includes the photocurable (meth)acrylate monomer, and the photocurable (meth)acrylate monomer may serve to adjust the surface hardness of the protective layer.

According to an exemplary embodiment of the present invention, the photocurable (meth)acrylate monomer included in the photocurable composition may have a glass transition temperature of 35° C. to 70° C., specifically, 45° C. to 60° C. When the glass transition temperature of the photocurable (meth)acrylate monomer is within the above-described range, the hardness of the protective layer may be effectively improved.

The photocurable (meth)acrylate monomer may include at least one of methacrylate, acrylate, dipentaerythritol hexaacrylate, dicyclopentadiene acrylate, trimethylpropane triacrylate, glycidyl methacrylate, and pentaerythritol triacrylate. The surface hardness of the protective layer may be improved by using a photocurable (meth)acrylate monomer including the above-described compound.

According to an exemplary embodiment of the present invention, the photocurable composition may include the inorganic nanoparticle. The photocurable composition including the inorganic nanoparticle may realize a protective layer having excellent hardness, and may prevent wrinkles from occurring on the surface of the protective layer. The inorganic nanoparticle may include at least one of silica, alumina, zirconia, zeolite, and titanium oxide. In addition, when the inorganic nanoparticle is silica, manufacturing costs of the protective layer may be reduced, and the protective layer may have excellent hardness.

According to an exemplary embodiment of the present invention, the inorganic nanoparticle included in the photocurable composition may be an inorganic nanoparticle having a (meth)acrylate group introduced into the surface thereof. Specifically, the (meth)acrylate group may be one substituted with an alkyl group having 1 to 20 carbon atoms.

When the above-described (meth)acrylate group is introduced, so that the surface of the inorganic nanoparticle is modified, the surface energy of the inorganic nanoparticle may be sufficiently lowered, and a relatively high level of hydrophobicity may be realized. In addition, as the inorganic nanoparticle having a (meth)acrylate group introduced into the surface thereof is positioned between crosslinked structures in the photocurable composition, the crosslinking density may be improved, thereby preventing curlings from being excessively produced and realizing a protective layer retaining excellent hardness.

According to an exemplary embodiment of the present invention, the (meth)acrylate group may include at least one of a methyl acrylate group, a methyl methacrylate group, an ethyl methacrylate group, a propyl methacrylate group, an octyl acrylate group, and a heptadecafluorodecyl acrylate group.

According to an exemplary embodiment of the present invention, based on 100 parts by weight of the photocurable urethane (meth)acrylate resin, the content of the photocurable (meth)acrylate monomer may be 10 parts by weight to 20 parts by weight, and the content of the inorganic nanoparticle may be 5 parts by weight to 20 parts by weight.

Specifically, the content of the photocurable (meth)acrylate monomer may be 15 parts by weight to 18 parts by weight based on 100 parts by weight of the photocurable urethane (meth)acrylate resin. Furthermore, the content of the inorganic nanoparticle may be 15 parts by weight to 18 parts by weight based on 100 parts by weight of the photocurable urethane(meth)acrylate resin.

According to an exemplary embodiment of the present invention, by adjusting the content of the photocurable (meth)acrylate monomer to the above-described range, it is possible to prevent the self-restoration performance of the protective layer from deteriorating and to maintain excellent surface hardness even though the thickness of the protective layer decreases. Furthermore, when the content of the inorganic nanoparticle is within the above-described range, it is possible to effectively prevent excessive curling from occurring on the protective layer.

According to an exemplary embodiment of the present invention, it is possible to realize a protective layer having an excellent adhesive property, which is not easily peeled off from a colored coating layer, by adjusting the composition of a photocurable composition including a photocurable urethane (meth)acrylate resin, a photocurable (meth)acrylate monomer, and an inorganic nanoparticle. Further, the multilayer marking film may retain effects of scratch prevention and scratch resistance, and simultaneously, inform a user of information such as an inherent identification number through a marking by laser irradiation.

According to an exemplary embodiment of the present invention, the photocurable composition may further include a fluorine-based compound. The fluorine-based compound has a structure in which a carbon-carbon main skeleton is substituted with fluorine, and the fluorine-based compound is disposed near the surface of the protective layer, and may serve to prevent scratches on the surface of the protective layer by controlling the slip property of the protective layer. In addition, the fluorine-based compound may include at least one of fluorinated (meth)acrylate and fluorinated epoxy acrylate.

According to an exemplary embodiment of the present invention, the protective layer may include the fluorine-based compound, thereby maximizing the self-restoration performance of the protective layer by improving the slip property of the protective layer.

According to an exemplary embodiment of the present invention, the content of the fluorine-based compound may be 0.1 part by weight to 5 parts by weight based on 100 parts by weight of the photocurable urethane (meth)acrylate resin. The slip property and self-restoration performance of the protective layer may be more improved by adjusting the content of the fluorine-based compound to the above-described range.

The photocurable composition may further include an additive. Specifically, the additive may include at least one of a photoinitiator, a dye, a filler, a reinforcing material, a flame retardant, a plasticizer, a lubricant, a stabilizer (an antioxidant, a UV absorber, a heat stabilizer), a release agent, an antistatic agent, a surfactant, a dispersant, a flow control agent, a leveling agent, an antifoaming agent, a surface modifier, a low-stress agent (silicone oil), silicone rubber, and a heat resistance improver.

According to an exemplary embodiment of the present invention, the photocurable composition may have a viscosity of 1 cP to 20 cP at about 25° C. By adjusting the viscosity of the photocurable composition to the above-described range, the workability when the protective layer is manufactured may be improved, and the time taken during the curing process may be shortened.

According to an exemplary embodiment of the present invention, the protective layer may have a haze value of 0.1% to 1%. The visibility of the protective layer may be improved by adjusting the haze value of the protective layer to 0.1% to 1%. Through the protective layer having the above-described haze value, it is possible to more clearly inform a user of inherent information and the like of a product, which are written on the colored coating layer through a marking by laser irradiation.

Accordingly, the multilayer marking film may more clearly inform a user of inherent information, and the like of a product, and simultaneously, effectively protect information and the like of a product, which are written on the colored coating layer, by the protective layer.

According to an exemplary embodiment of the present invention, the protective layer may have a thickness of 0.1 μm to 10 μm. Specifically, the protective layer may have a thickness of 0.5 μm to 5 μm. When the thickness of the protective layer is within the above-described range, it is possible to prevent the mechanical properties and self-restoration performance of the protective layer from deteriorating. Furthermore, by adjusting the thickness of the protective layer to the above-described range, the laser irradiation marking efficiency with respect to the colored coating layer may be improved, and the visibility of information and the like written on the multilayer marking film may be excellent.

According to an exemplary embodiment of the present invention, the adhesive layer may include a thermally cured material of an adhesive composition including a thermosetting acrylic resin and a thermal curing agent. The thermosetting acrylic resin may be a polymer of a monomer including at least one of ethylhexyl (meth)acrylate, methyl (meth)acrylate, butyl (meth)acrylate, acrylic acid, and glycidyl (meth)acrylate. By using a thermosetting acrylic resin including the polymer of the monomer, it is possible to realize a multilayer marking film having high adhesive strength, excellent long-term reliability against an exposure of an automobile-related solution and excellent light fastness.

According to an exemplary embodiment of the present invention, a thermosetting acrylic resin used in the adhesive composition may have a weight average molecular weight of 500,000 g/mol to 1,500,000 g/mol. The adhesive composition including the thermosetting acrylic resin having the above-described weight average molecular weight may realize an adhesive layer having excellent long-term reliability and light fastness.

Further, the thermal curing agent chemically reacts with the thermosetting acrylic resin to enable the adhesive layer to be formed in the form of a coating film and the cured material of the adhesive composition to have an appropriate gel content. Accordingly, the adhesive layer may secure an appropriate interfacial attachment property with the colored base layer and may have a high attachment property with respect to a final article.

Specifically, the thermal curing agent may include at least one of an isocyanate-based curing agent, an aziridine-based curing agent, a metal chelate-based curing agent, 2,2-dimethoxy-1,2-diphenylethan-1-one, and 1-hydroxy-cyclohexyl-phenyl-ketone. The above-described type of thermal curing agent has excellent compatibility with the thermosetting acrylic resin and may exhibit high curing efficiency.

The adhesive composition may include the thermal curing agent in an amount of about 0.01 part by weight to about 0.5 part by weight based on 100 parts by weight of a solid content of the thermosetting acrylic resin. By adjusting the content of the thermal curing agent to the above-described range, it is possible to easily secure physical properties and benefits of the adhesive layer, and greatly contribute to the friability and durability of the multilayer marking film.

According to an exemplary embodiment of the present invention, the adhesive layer may have an attachment strength of 1,400 gf/cm to 4,000 gf/cm to an adherend formed of a metallic material. Specifically, the attaching strength of the adhesive layer to the adherend formed of a metallic material may be 2,000 gf/cm to 3,500 gf/cm. The adhesive layer is a layer which imparts an adhesive property with a predetermined level to a final article, and the adhesive property of the adhesive layer may affect the friability of the multilayer marking film.

According to an exemplary embodiment of the present invention, the multilayer marking film may include both the adhesive layer and the colored base layer even when the multilayer marking film includes an adhesive layer retaining an attaching strength within the range, thereby easily measuring attaching strength properties without damage to or tearing of the multilayer marking film. Further, when the multilayer marking film is applied to a final article, the multilayer marking film may realize a long-term attachment property through an adhesive layer retaining an attaching strength within the range.

Further, the multilayer marking film has various uses, and may be utilized as, for example, a label to be attached to an automobile. When the multilayer marking film is applied to an automobile painted plate, which is formed of a metallic material, a long-term attachment property of the multilayer marking film may be realized through an adhesive layer exhibiting an attaching strength within the range.

According to an exemplary embodiment of the present invention, the adhesive layer may have a thickness of 20 μm to 50 μm. By adjusting the thickness of the adhesive layer to 20 μm to 50 μm, the attachment property of the multilayer marking film to a final article may be secured, and simultaneously, the friability may be greatly improved.

According to an exemplary embodiment of the present invention, the multilayer marking film may implement improved friability by including the colored coating layer, the colored base layer, and the adhesive layer together, and the interfacial attachment property among the respective layers may be appropriately controlled to simultaneously secure precision of the marking by laser irradiation and durability for a final article.

In addition, the multilayer marking film may secure characteristics capable of precisely carrying out a marking by laser irradiation by appropriately designing the thickness of each layer, may implement friability, and may secure characteristics in which damage or tearing does not occur during the measurement of attaching strength in spite of a high attachment property.

According to an exemplary embodiment of the present invention, the colored coating layer is etched by laser irradiation, and may have the markability by laser irradiation for removing the etched portion. The multilayer marking film is a film in which various information may be written by laser irradiation, and the marking by laser irradiation may be carried out on the colored coating layer included in the multilayer marking film. Specifically, the laser-irradiated portion of the colored coating layer is etched and removed, and simultaneously, interacts with the colored base layer, so that various letters, designs, and the like may be written.

Accordingly, according to an exemplary embodiment of the present invention, additional letters, designs, and the like may be written on the multilayer marking film by etching a colored coating layer having an uneven portion formed in the form of design, letter, logo, and the like by laser irradiation.

According to an exemplary embodiment of the present invention, it is possible to use a fiber laser using an optical fiber as a resonator, a carbon dioxide ($CO_2$) laser, and the like as a laser for etching the colored coating layer. Furthermore, the colored coating layer may be irradiated with a laser having a wavelength value of 900 nm to 1,100 nm and an average power of 10 W to 30 W at a scan speed of 100 mm/s to 4,000 m/s. By irradiating the colored coating layer with a laser under the above-described conditions, the colored coating layer may be easily etched.

According to an exemplary embodiment of the present invention, after a marking by laser irradiation is carried out on the colored coating layer including the uneven portion, the protective layer may be formed on top of the colored coating layer. Further, after the protective layer is formed on top of the colored coating layer including the uneven portion, the marking by laser irradiation may be carried out on the colored coating layer by penetrating the transparent protective layer. Specifically, the protective layer according to an exemplary embodiment of the present invention does not degenerate or is not damaged even though the protective layer is penetrated by light for marking a colored coating layer, and the physical properties of the protective layer, such as durability and visibility, may not deteriorate.

Figure 3A:
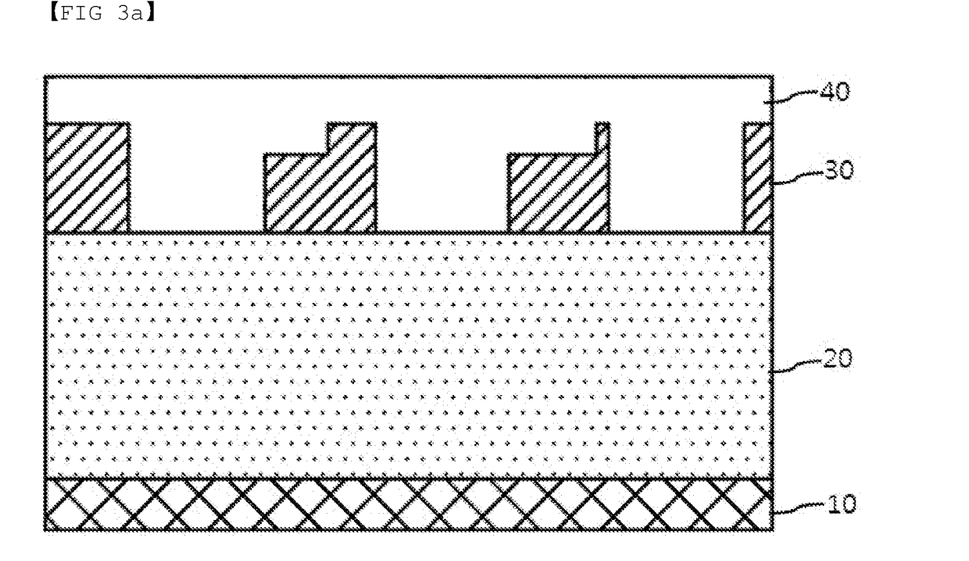
FIGS. 3A and 3B are views illustrating a multilayer marking film on which marking by laser irradiation is performed according to an exemplary embodiment of the present invention.
Figure 3B:
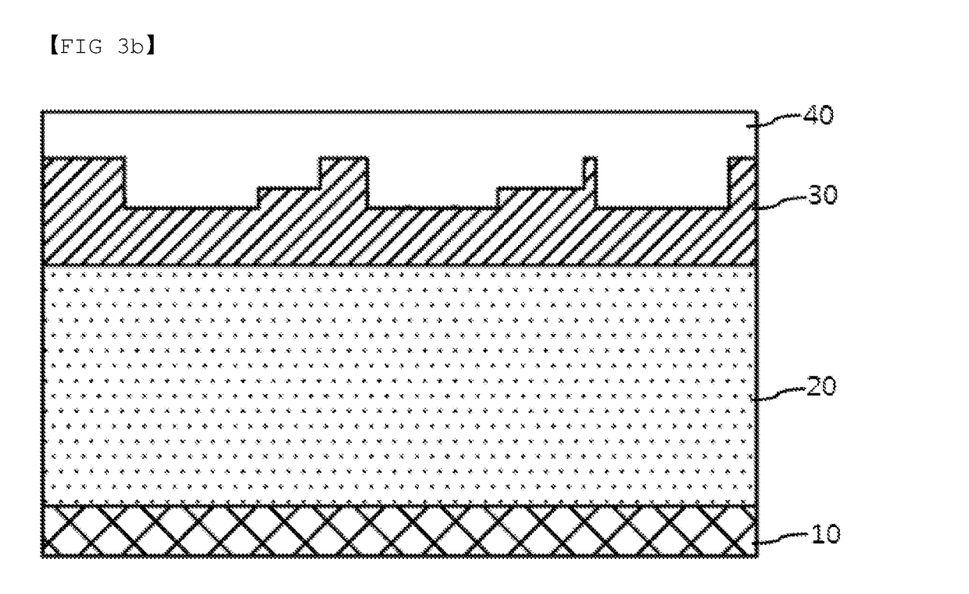

FIGS. 3A and 3B are views schematically illustrating a multilayer marking film on which marking by laser irradiation is performed according to an exemplary embodiment of the present invention. Specifically, FIGS. 3A and 3B illustrate that the colored coating layer having the uneven portion formed on the surface thereof is marked by laser irradiation, and then a protective layer is formed on top of the colored coating layer.

As illustrated in FIG. 3A, marking by laser irradiation may be performed as much as the thickness of the colored coating layer 30, and as illustrated in FIG. 3B, marking by laser irradiation may be performed on a portion where the colored coating layer 30 has thickness.

According to an exemplary embodiment of the present invention, since the colored base layer and the colored coating layer have different colors from each other, various colors may be exhibited depending on an etching depth of an etched portion when the colored coating layer is etched by laser irradiation.

Referring to FIG. 3A, when an etching is performed as much as the thickness of the colored coating layer 30 by using a laser, a user may visually recognize only the first color of the colored base layer 20 with regard to the etched portion of the colored coating layer 30. Further, as illustrated in FIG. 3B, when a portion of the thickness of the colored coating layer 30 is etched by a laser, with regard to the etched portion of the colored coating layer 30, a user may visually recognize a color which is expressed as the first color of the colored base layer 20 overlaps the second color of the colored coating layer 30 remaining without being etched. Accordingly, depending on the thickness of the colored coating layer 30 to be etched, a color which a user may recognize may be adjusted.

According to an exemplary embodiment of the present invention, marking by laser irradiation may also be performed on the uneven portion formed on the colored coating layer. By etching a portion or all of the uneven portion formed on the surface of the colored coating layer by laser irradiation, more various letters, designs, and the like may be realized on the multilayer marking film.

According to an exemplary embodiment of the present invention, the multilayer marking film may realize a background with various patterns through an uneven portion provided on the colored coating layer, and can be additionally written with letters or designs having various colors by performing laser irradiation on the colored coating layer. Specifically, when the multilayer marking film is used in an automobile, a logo, and the like may be realized through the uneven portion, and the colored coating layer may be etched by laser irradiation, thereby additionally displaying information on various parts of a vehicle, such as tire pressure or a fuel type, or additionally displaying inherent security information such as a chassis number and a vehicle identification number.

According to an exemplary embodiment of the present invention, the multilayer marking film has friability and thus may secure characteristics in which inherent information written in the multilayer marking film cannot be arbitrarily changed, and cannot be forged or altered. Hereinafter, the present invention will be described in more detail through Examples. These Examples are provided for only explaining the present invention, and are not intended to limit the present invention.

Preparation of Base Composition

Preparation Example 1

MIRAMER PU340 (manufactured by Miwon Special Chemical Co., Ltd.) having a weight average molecular weight of 2,400 g/mol and being trifunctional as a urethane (meth)acrylate oligomer, 1,6-hexanediol diacrylate being a chained-aliphatic (meth)acrylate monomer as a (meth)acrylate monomer, having a weight average molecular weight of 226 g/mol, and being difunctional, and titanium dioxide ($TiO_2$) as a pigment were prepared.

Thereafter, a base composition including 25 parts by weight of the chained-aliphatic (meth)acrylate monomer and 87.5 parts by weight of the pigment based on 100 parts by weight of the urethane (meth)acrylate oligomer were manufactured.

Preparation Examples 2 and 3

A urethane (meth)acrylate oligomer, a (meth)acrylate monomer, and a pigment were prepared as in the following Table 1, and a base composition having the composition shown in Table 1 was manufactured.

In the following Table 1, MIRAMER PU340 (manufactured by Miwon Special Chemical Co., Ltd.) having a weight average molecular weight of 2,400 g/mol and being trifunctional was used as a urethane (meth)acrylate oligomer, the difunctional urethane (meth)acrylate oligomer was SU01020 (manufactured by SHIN-A T&C), the chained-aliphatic (meth)acrylate monomer was a difunctional 1,6-hexanediol diacrylate, and the cyclo-aliphatic (meth)acrylate monomer was a difunctional 1,3-adamantanediol diacrylate.

TABLE 1

| | Urethane (meth)acrylate oligomer | | | (Meth)acrylate monomer | | | Pigment ($TiO_2$) |
|---|---|---|---|---|---|---|---|
| | Type | Mw (g/mol) | Content (parts by weight) | Type | Mw (g/mol) | Content (parts by weight) | Content (parts by weight) |
| Preparation Example 1 | Trifunctional | 2,400 | 100 | Chained-aliphatic | 226 | 25 | 87.5 |
| Preparation Example 2 | Trifunctional | 2,400 | 100 | Cyclo-aliphatic | 276 | 20 | 90 |
| | | | | Chained-aliphatic | 226 | 13 | |
| Preparation Example 3 | Trifunctional | 2,500 | 100 | — | | | 87.5 |
| | Difunctional | 5,000 | 25 | | | | |

Manufacture of Coating Composition

Preparation Example 4

A trifunctional urethane acrylate oligomer having a weight average molecular weight of 1,700 g/mol, a difunctional urethane acrylate oligomer having a weight average molecular weight of 1,000 g/mol, a bisacrylphosphine-based photoinitiator (manufactured by BASF Corporation, Irgacure 819) as a photoinitiator, an acrylic block copolymer dispersant being a block copolymer of acrylonitrile, isoprene, styrene, and butadiene as a dispersant, and carbon black having a particle diameter of 20 nm as a pigment were prepared.

Thereafter, a photocurable mixed oligomer including the trifunctional urethane acrylate oligomer and the difunctional urethane acrylate oligomer at a weight ratio of 9:1 was manufactured. Next, based on 100 parts by weight of a solid content, a coating composition including 80 parts by weight of the photocurable mixed oligomer, 2 parts by weight of the dispersant, 8 parts by weight of the photoinitiator, and 10 parts by weight of the carbon black was manufactured.

Preparation Examples 5 and 6

The trifunctional urethane acrylate oligomer, the difunctional urethane acrylate oligomer, the photoinitiator, the dispersant, and the carbon black, which are the same as those in Preparation Example 4, were prepared, and a coating composition having the composition shown in the following Table 2 was manufactured.

In Preparation Example 6, a thermosetting urethane acrylate oligomer having a hydroxyl group and three acrylate groups as a thermosetting oligomer and a toluene diisocyanate-based thermal curing agent (manufactured by Asahi Kasei Corporation) as a thermal curing agent were prepared.

TABLE 2

|  |  | Preparation Example 4 | Preparation Example 5 | Preparation Example 6 |
|---|---|---|---|---|
| Photocurable mixed oligomer | Weight ratio of trifunctional:difunctional | 9:1 | 8:2 | — |
|  | Content (parts by weight) | 80 | 80 | — |
| Thermosetting oligomer | Content (parts by weight) | — | — | 80 |
| Dispersant | Content (parts by weight) | 2 | 2 | 2 |
| Photoinitiator | Content (parts by weight) | 8 | 8 | — |
| Thermal curing agent | Content (parts by weight) | — | — | 8 |
| Carbon black | Content (parts by weight) | 10 | 10 | 10 |

Manufacture of Photocurable Composition

Preparation Example 7

A urethane silicone acrylate resin having a glass transition temperature of 20° C. and a weight average molecular weight of 8,000 g/mol and being nonfunctional as a photocurable urethane (meth)acrylate resin, a pentaerythritol triacrylate having a glass transition temperature of 50° C. as a photocurable (meth)acrylate monomer, silica having a methyl methacrylate group introduced into the surface thereof as an inorganic nanoparticle, fluorine acrylate (DIC, RS-75) as a fluorine-based compound, and a photoinitiator (BASF, Irgacure 184) were prepared.

Thereafter, based on 100 parts by weight of the photocurable urethane (meth)acrylate resin, a photocurable composition including 15 parts by weight of the photocurable (meth)acrylate monomer, 15 parts by weight of the inorganic nanoparticle, 5 parts by weight of the fluorine-based compound, and 6 parts by weight of the photoinitiator was manufactured.

Preparation Examples 8 and 9

The photocurable urethane (meth)acrylate resin, the photocurable (meth)acrylate monomer, and the initiator, which is the same as those prepared in Preparation Example 7, were prepared. Thereafter, a photocurable composition was manufactured by using the components and the contents described in the following Table 3.

The photocurable composition according to Preparation Example 8 does not include an inorganic nanoparticle, and the photocurable composition according to Preparation Example 9 includes an inorganic nanoparticle of which the surface is not modified.

TABLE 3

|  | Photocurable urethane (meth) acrylate resin (parts by weight) | Photocurable acrylate-based monomer (parts by weight) | Inorganic nanoparticle (parts by weight) | Fluorine-based compound (parts by weight) | Initiator (parts by weight) |
|---|---|---|---|---|---|
| Preparation Example 7 | 100 | 15 | 15 | 5 | 6 |
| Preparation Example 8 | 100 | 30 | — | 5 | 6 |
| Preparation Example 9 | 100 | 15 | 15 | 5 | 6 |

Example 1

The base composition according to Preparation Example was applied onto one surface of a polyethylene terephthalate (PET) release film, and the same PET release film was laminated on top of the base composition applied onto the release film. Next, a laminate in which a release film, a colored base layer, and a release film were sequentially provided was manufactured by curing the base composition through electron beam curing with electron beam energy of 40 kGy. One release film was peeled off from the laminate, the coating composition according to Preparation Example 4 was applied onto one surface of the colored base layer from which the release film was peeled off, and then a colored coating layer was formed by UV-curing the coating composition.

Next, the other release film was peeled off from the laminate, a corona treatment was performed on the other surface of the colored base layer, and then an adhesive composition including 0.04 parts by weight of an aziridine curing agent as a thermal curing agent based on 100 parts by weight of a thermosetting acrylic resin having a weight average molecular weight (Mw) of 1,300,000 g/mol was applied thereon, and an adhesive layer was formed by thermally curing the adhesive composition at 110° C. for 3 minutes. As a result, a multilayer marking film including a colored coating layer having a thickness of 2 μm, a colored base layer having a thickness of 100 μm, and an adhesive layer having a thickness of 25 μm was manufactured.

Thereafter, an uneven portion was formed on the surface of the colored coating layer by etching a thickness as much as 0.5 μm from the surface of the colored coating layer using a laser. Next, the photocurable composition according to Preparation Example 7 was applied onto the surface of the colored coating layer having the uneven portion formed on the surface thereof, and then a protective layer having a thickness of 10 μm was formed by photocuring the photocurable composition.

Examples 2 to 4

A multilayer marking film was manufactured in the same manner as in Example 1, except that the base composition, the coating composition, and the photocurable composition were used as in the following Table 4.

Comparative Example 1 to Example 4

A multilayer marking film was manufactured in the same manner as in Example 1, except that the base composition, the coating composition, and the photocurable composition were used as in the following Table 4.

TABLE 4

|  | Base composition | Coating composition | Photocurable composition |
|---|---|---|---|
| Example 1 | Preparation Example 1 | Preparation Example 4 | Preparation Example 7 |
| Example 2 | Preparation Example 1 | Preparation Example 5 | Preparation Example 7 |
| Example 3 | Preparation Example 2 | Preparation Example 4 | Preparation Example 7 |
| Example 4 | Preparation Example 2 | Preparation Example 5 | Preparation Example 7 |
| Comparative Example 1 | Preparation Example 3 | Preparation Example 4 | Preparation Example 7 |
| Comparative Example 2 | Preparation Example 1 | Preparation Example 6 | Preparation Example 7 |
| Comparative Example 3 | Preparation Example 1 | Preparation Example 4 | Preparation Example 8 |
| Comparative Example 4 | Preparation Example 2 | Preparation Example 5 | Preparation Example 9 |

Evaluation of Friability

For each of the multilayer marking films in the Examples and the Comparative Examples, a sample having a size of 75 mm×150 mm was attached to a painted plate formed of an aluminum material, and then the friability was evaluated according to whether a broken shape was shown during the attempt to forcibly detach the sample by using a knife after the sample was exposed to isopropyl alcohol (IPA) at a concentration of 100% for 1 hour, or whether the sample could be detached in the initially attached form as it was. The results are shown in the following Table 5. When the sample could be detached in the initially attached form as it was, the friability was evaluated as 'NG', and when the broken shape was shown during the attempt to detach the sample, the friability was evaluated as 'OK'.

Measurement of Tensile Strength

For each of the multilayer making films in the Examples and the Comparative Examples, a sample having a rectangular shape with a size of 1 cm×4 cm was prepared, both ends of the sample were fixed by using Texture Analyzer XT Plus (manufactured by Stable Micro Systems Co., Ltd.), the sample was pulled at a rate of 300 mm/min, and then the tensile strength at a break point was measured, and the results are shown in the following Table 5.

Measurement of Elongation

For each of the multilayer marking films in the Examples and the Comparative Examples, a sample having a rectangular shape with a size of 1 cm×4 cm was prepared, both ends of the sample were fixed by using Texture Analyzer XT Plus (manufactured by Stable Micro Systems Co., Ltd.), the sample was pulled at a rate of 300 mm/min, and then the elongation at a break point was measured, and the results are shown in the following Table 5.

Evaluation of Self-Restoration Property

For each of the multilayer marking films in the Examples and the Comparative Examples, the outermost surface of the multilayer marking film was scratched with a brass brush using a video recorder, and then the recovery time was measured, and the results are shown in the following Table 5.

Curling Test

Each of the multilayer marking films in the Examples and the Comparative Examples was cut into a size of 10 cm length and 10 cm width, and then the vertex heights of the tetragon were measured, the highest value among the measured 4 values was defined as a curling value, and the curling values are shown in the following Table 5.

Surface Hardness Test

For each of the multilayer marking films in the Examples and the Comparative Examples, the hardness was evaluated by a pencil hardness tester manufactured by Toyoseiki Co., Ltd., in accordance with the test method of ASTM D3502, and the results are shown in the following Table 5. The experiment was performed 5 times in total with the pencil hardness tester, and the number of times when scratches were not seen by the unaided eye as compared to the total number of experiments is shown in the following Table 5.

TABLE 5

|  | Friability | Tensile strength (gf) | Elongation (%) | Self-restorability (sec) | Curling (mm) | Surface hardness |
|---|---|---|---|---|---|---|
| Example 1 | OK | 4,050 | 9 | 2 | 3 | 5/5 |
| Example 2 | OK | 4,120 | 8.6 | 2 | 2.6 | 5/5 |
| Example 3 | OK | 5,800 | 8 | 2 | 2 | 5/5 |
| Example 4 | OK | 5,900 | 7.5 | 2 | 2 | 5/5 |
| Comparative Example 1 | NG | 1,200 | 11 | 2 | 3.2 | 5/5 |
| Comparative Example 2 | OK | 3,900 | 9.3 | — |  |  |
| Comparative Example 3 | OK | 4,050 | 9 | 2 | 9.1 | 5/5 |
| Comparative Example 4 | OK | 5,900 | 7.5 | 2 | 5.4 | 5/5 |

Referring to Table 5, it was confirmed that the multilayer marking films according to Examples 1 to 4 of the present invention retained excellent friability and retained appropriate tensile strength and elongation. Further, it could be confirmed that the protective layers of the multilayer marking films according to Examples 1 to 4 had excellent self-restorability and curling prevention effects.

In contrast, the multilayer marking film according to Comparative Example 1 did not retain friability, and in the multilayer marking film according to Comparative Example 2, the protective layer could not be laminated due to the problem of the cure degree of the colored coating layer. Furthermore, a larger number of curlings occurred in the protective layers of the multilayer marking films according to Comparative Examples 3 and 4 than in the protective layers of the multilayer marking films according to the Examples of the present invention, and as a result, it can be confirmed that the multilayer marking films according to Comparative Examples 3 and 4 have an inferior curl prevention effect than the multilayer marking films according to the Examples of the present invention.

EXPLANATION OF REFERENCE NUMERALS AND SYMBOLS

100: Multilayer marking film
10: Adhesive layer
20: Colored base layer
30: Colored coating layer
31: Uneven portion 40: Protective layer

The invention claimed is:

1. A multilayer marking film, comprising, in sequentially order:
an adhesive layer;
a colored base layer having a first color;
a colored coating layer having a second color different from the first color, wherein the color coating layer having a first surface and a second surface opposite the first surface, wherein the second surface is adjacent to the colored base layer; and
a protective layer provided on the first surface of the colored coating layer,
wherein the protective layer comprises a cured material prepared by curing a photocurable composition consisting of a photocurable urethane (meth)acrylate resin, a photocurable (meth)acrylate monomer, an inorganic nanoparticle, an initiator, and optionally a fluorine-based compound, wherein the photocurable urethane (meth)acrylate resin is a polyfunctional urethane (meth)acrylate resin having 2 to 15 (meth)acrylate groups,
wherein the inorganic nanoparticle is a surface modified inorganic nanoparticle having a (meth)acrylate group on the surface thereof,
wherein the colored base layer comprises a cured material prepared by curing a base composition comprising a urethane (meth)acrylate oligomer, a (meth)acrylate monomer, and a pigment,
wherein the colored coating layer comprises an uneven portion having a thickness (h) extending from the first surface towards the second surface,
wherein the colored coating layer comprises a photocured material prepared by photocuring a coating composition comprising a photocurable mixed oligomer comprising a trifunctional urethane (meth)acrylate oligomer and a difunctional urethane (meth)acrylate oligomer, a photoinitiator, a dispersant, and a pigment,
wherein a weight ratio of the trifunctional urethane (meth)acrylate oligomer and the difunctional urethane (meth)acrylate oligomer comprised in the photocurable mixed oligomer is 9:1 to 8:2, and
wherein a curling of protection layer ranges from 2 mm to 3 mm.

2. The multilayer marking film of claim 1, wherein the thickness (h) of the uneven portion is as much as 2% or more to 50% or less of a thickness (d) of the colored coating layer, wherein the thickness (d) is defined between the first and second surfaces of the colored coating layer.

3. The multilayer marking film of claim 1, wherein the urethane (meth)acrylate oligomer has a weight average molecular weight of 2,000 g/mol to 10,000 g/mol.

4. The multilayer marking film of claim 1, wherein the (meth)acrylate monomer comprises at least one of a cycloaliphatic (meth)acrylate monomer, an epoxy-based (meth)acrylate monomer, a chained-aliphatic (meth)acrylate monomer, and a polyol-based (meth)acrylate monomer.

5. The multilayer marking film of claim 1, wherein the (meth)acrylate monomer has a weight average molecular weight of 200 g/mol to 500 g/mol.

6. The multilayer marking film of claim 1, wherein the (meth)acrylate monomer is present in the base composition in an amount of more than 0 part by weight and 66 parts by weight or less based on 100 parts by weight of the urethane (meth)acrylate oligomer.

7. The multilayer marking film of claim 1, wherein the pigment is present in the based composition in an amount of 50 parts by weight to 135 parts by weight based on 100 parts by weight of the urethane (meth)acrylate oligomer.

8. The multilayer marking film of claim 1, wherein the photocurable urethane (meth)acrylate resin has a glass transition temperature of 10° C. to 30° C.

9. The multilayer marking film of claim 1, wherein the photocurable (meth)acrylate monomer has a glass transition temperature of 35° C. to 70° C.

10. The multilayer marking film of claim 1, the photocurable (meth)acrylate monomer is present in the photocurable composition in amount of 10 parts by weight to 20 parts by weight, and the inorganic nanoparticle is present in the photocurable composition in amount of 5 parts by weight to 20 parts by weight, based on 100 parts by weight of the photocurable urethane (meth)acrylate resin.

11. The multilayer marking film of claim 1, wherein the photocurable composition further comprises the fluorine-based compound, and
wherein the fluorine-based compound comprises at least one of fluorinated (meth)acrylate and fluorinated epoxy acrylate.

12. The multilayer marking film of claim 11, wherein the fluorine-based compound is present in the photocurable composition in amount of 0.1 part by weight to 5 parts by weight based on 100 parts by weight of the photocurable urethane (meth)acrylate resin.

13. The multilayer marking film of claim 1, wherein the photocurable mixed oligomer is present in the coating composition in amount of 50 parts by weight to 95 parts by weight based on 100 parts by weight of a solid content of the coating composition.

* * * * *